(12) United States Patent
Li et al.

(10) Patent No.: US 12,477,635 B2
(45) Date of Patent: Nov. 18, 2025

(54) LIGHT ASSEMBLY FOR POWERING AN INCREASED NUMBER OF LIGHTING UNITS IN SERIES

(71) Applicant: VALEO VISION, Bobigny (FR)

(72) Inventors: Zaigang Li, Wuhan (CN); Shishi Fu, Wuhan (CN)

(73) Assignee: VALEO VISION, Bobigny (FR)

( * ) Notice: Subject to any disclaimer, the term of this patent is extended or adjusted under 35 U.S.C. 154(b) by 199 days.

(21) Appl. No.: 18/258,391

(22) PCT Filed: Dec. 21, 2020

(86) PCT No.: PCT/CN2020/138078
§ 371 (c)(1),
(2) Date: Jun. 20, 2023

(87) PCT Pub. No.: WO2022/133673
PCT Pub. Date: Jun. 30, 2022

(65) Prior Publication Data
US 2024/0306277 A1    Sep. 12, 2024

(51) Int. Cl.
*H05B 45/10* (2020.01)
*H05B 45/325* (2020.01)
(Continued)

(52) U.S. Cl.
CPC ............. *H05B 45/48* (2020.01); *H05B 45/10* (2020.01); *H05B 45/325* (2020.01);
(Continued)

(58) Field of Classification Search
CPC ...... H05B 45/10; H05B 45/30; H05B 45/325; H05B 45/48; H05B 47/10; H05B 47/155; H05B 47/16; B60Q 1/34
See application file for complete search history.

(56) References Cited

U.S. PATENT DOCUMENTS

| 9,271,345 B2 | 2/2016 | Welten |
| 9,750,093 B2 | 8/2017 | Welten |

(Continued)

FOREIGN PATENT DOCUMENTS

| CN | 104640324 A | 5/2015 |
| CN | 107123398 A | 9/2017 |

(Continued)

OTHER PUBLICATIONS

International Search Report issued Sep. 18, 2021 in PCT/CN2020/138078 filed on Dec. 21, 2020, 4 pages.

(Continued)

*Primary Examiner* — Jimmy T Vu
(74) *Attorney, Agent, or Firm* — Oblon, McClelland, Maier & Neustadt, L.L.P.

(57) ABSTRACT

A light assembly including at least a first lighting module with several sequences of lighting units in series. A power source is configured to power at least the first lighting module and is configured to power a maximum number N of lighting units at the same time. A command module is configured to determine sequences to be activated and the number Na of lighting units comprised in the sequences to be activated. If Na is greater than N, the command module groups the sequences to be activated in at least two groups, each group including less than N lighting units. The command module powers cyclically and sequentially each of the groups based on a cycle period, wherein the cycle period is such that a viewer perceives the at least two groups as being activated at the same time.

18 Claims, 5 Drawing Sheets

(51) Int. Cl.
*H05B 45/48* (2020.01)
*H05B 47/155* (2020.01)
*H05B 47/16* (2020.01)
*B60Q 1/34* (2006.01)

(52) U.S. Cl.
CPC ........... *H05B 47/155* (2020.01); *H05B 47/16* (2020.01); *B60Q 1/34* (2013.01)

(56) References Cited

U.S. PATENT DOCUMENTS

| 10,159,126 | B2 | 12/2018 | Welten | |
|---|---|---|---|---|
| 10,178,725 | B2 | 1/2019 | Ko | |
| 2008/0202312 | A1* | 8/2008 | Zane | H05B 45/3725 84/297 R |
| 2011/0248640 | A1* | 10/2011 | Welten | H05B 45/48 315/210 |
| 2016/0174310 | A1 | 6/2016 | Welten | |
| 2017/0086266 | A1* | 3/2017 | Büthker | H05B 45/48 |
| 2018/0042075 | A1 | 2/2018 | Welten | |
| 2018/0139807 | A1* | 5/2018 | Ko | H05B 45/30 |
| 2020/0148096 | A1* | 5/2020 | Tomono | B60Q 1/1407 |

FOREIGN PATENT DOCUMENTS

| JP | 2020-78999 A | 5/2020 |
|---|---|---|
| WO | WO 2010/027254 A1 | 3/2010 |

OTHER PUBLICATIONS

Extended European Search Report issued Aug. 1, 2024, in corresponding European Patent Application No. 20966254.4, 14 pages.
Japanese Office Action issued Jan. 24, 2025, in corresponding Japanese Patent Application No. (with English Translation Summary), 5 pages.

* cited by examiner

[Fig 1]
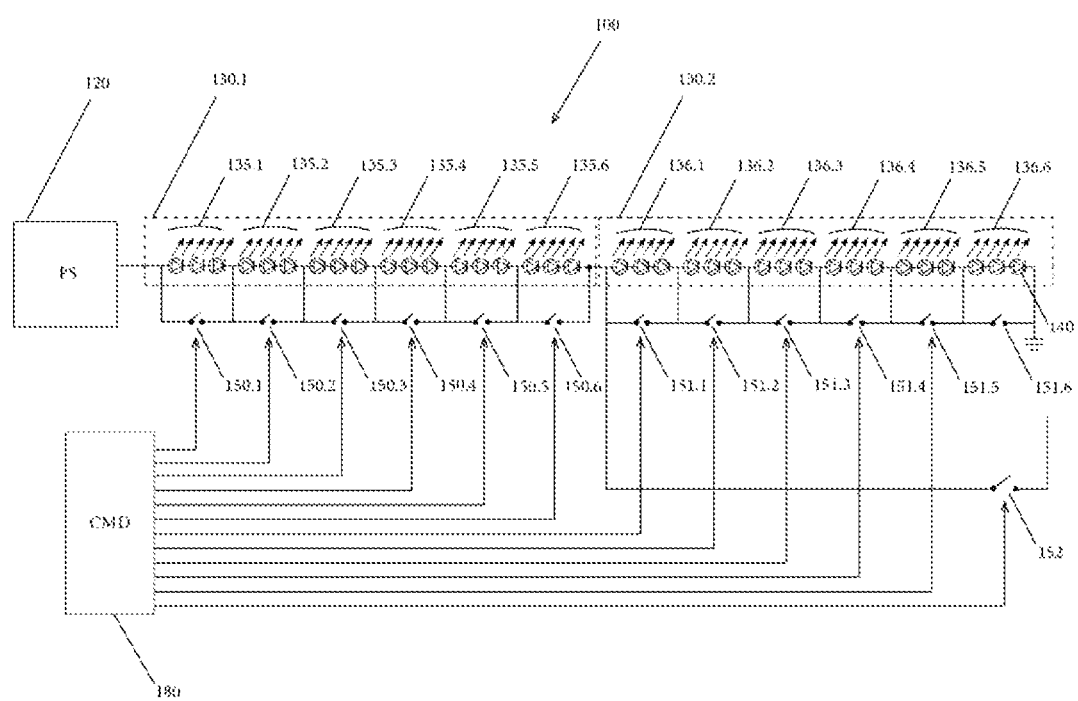

[Fig 2]
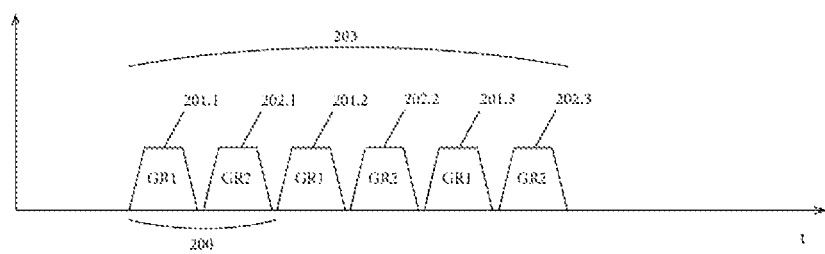

[Fig 3]
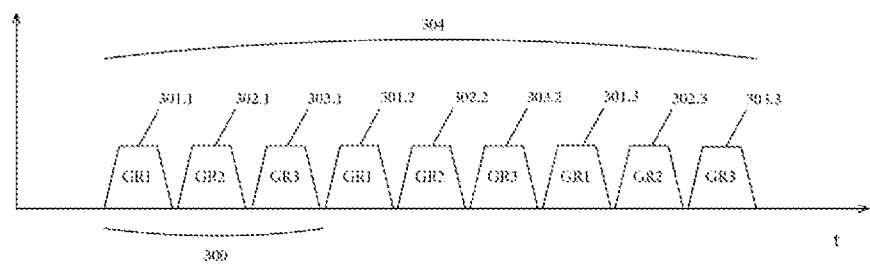

[Fig 4]
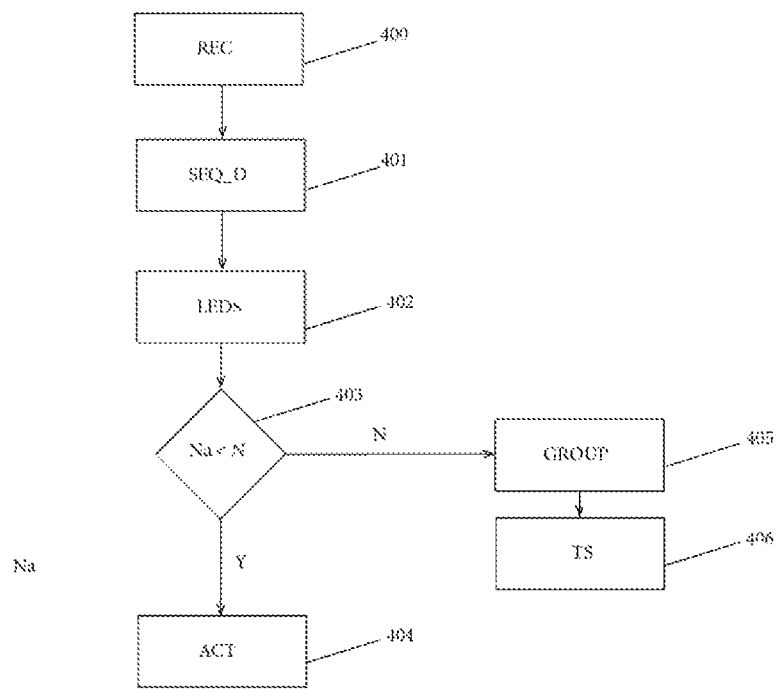

[Fig 5]
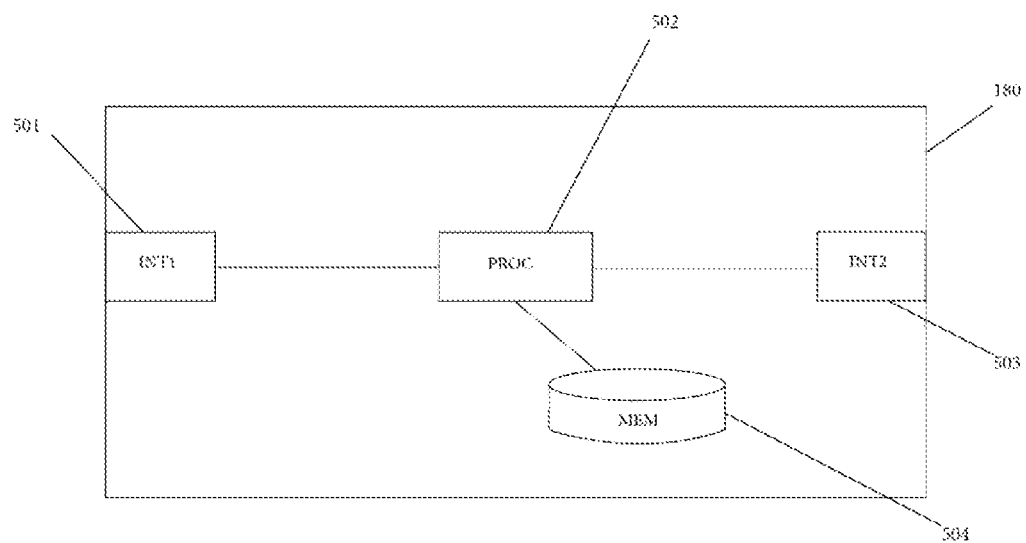

LIGHT ASSEMBLY FOR POWERING AN INCREASED NUMBER OF LIGHTING UNITS IN SERIES

The present invention concerns the technical field of the control of lighting modules. It concerns in particular, while not exclusively, a light assembly comprising a lighting module with sequences of lighting units and a control module for controlling the powering of the sequences of the lighting module.

It is advantageous in the case where the light assembly comprises numerous LEDs in series that cannot be powered simultaneously by a unique power source.

In automotive vehicles, a light assembly generally comprises lighting units allocated to specific lighting and/or signaling function. In what follows, the term lighting function is used to designate both lighting and signaling functions.

The U.S. Pat. No. 8,525,415B2 discloses a system for powering different lighting functions by a common source, using time sharing. However, the functions are powered in parallel, and within one function the number of LEDs is limited by the capacity of the power source.

Therefore, in this architecture, the number of LEDs per function is limited by the capacity of the power source.

The present invention improves the situation.

To this end, a first aspect of the invention concerns a light assembly comprising
- at least a first lighting module configured to perform a first lighting function and comprising several sequences of at least one lighting unit in series;
- a power source configured to power at least the first lighting module, wherein the power source is configured to power a maximum number N of lighting units at the same time; and
- a command module configured to control activation and deactivation of each of the sequences of lighting units.

The command module is configured to
- determine sequences to be activated and the number Na of lighting units comprised in the sequences to be activated;
- if Na is greater than N, group the sequences to be activated in at least two groups, each group comprising less than N lighting units;
- power cyclically and sequentially each of the groups based on a cycle period, wherein the cycle period is such that a viewer perceives the at least two groups as being activated at the same time.

The invention therefore allows to overcome the shortcomings of the prior art. Indeed, in the prior art, the time sharing is based on the number of functions, whereas the present invention proposes to group sequences of less than N LEDs within the same function or between different functions, which allows to have more than N lighting units in series perceived by a viewer as turned on at the same time.

According to some embodiments, the assembly may further comprise at least a second lighting module configured to perform at least a second lighting function. The second lighting module may comprise several sequences, each sequence comprising at least one lighting unit.

This allows powering several functions in series. The several lighting functions can be perceived as being activated at the same time and each function may correspond to more than N lighting units, if required.

In complement, each group may comprise sequences of the same lighting module.

This improves the visual perception of each lighting function by the user.

Alternatively, at least one group may comprise sequences of the first lighting module and of the second lighting module.

This improves the flexibility of the light assembly according to the invention and allows using a minimum number of groups, thereby facilitating the control the sequences and reducing power losses due to time sharing.

According to some embodiments, the second lighting function may be a daytime lighting function or a position lighting function.

This allows improving the visibility of a vehicle including the light assembly to the other users of the road.

In complement, the second lighting module is configured to perform both a daytime lighting function and a position lighting function.

This allows performing two functions using the same lighting module, thereby reducing the size of the light assembly.

According to some embodiments, the light assembly may comprise a function switching unit in parallel to the second lighting module, and the command module may be configured to close the switching unit to deactivate the second lighting module.

This allows to simplify the control when the second function module is turned off.

In complement, the second lighting module and the function switching unit may be in low side position compared to the first lighting module.

This allows using standard controllers generally having a low side switch.

According to some embodiments, the first lighting function may be a Turn Indicator, TI, function.

This function is particularly adapted to be controlled using sequences of switching units in series.

According to some embodiments, the assembly may further comprise a switching unit in parallel to each of the sequence of lighting units, and the command module may be configured to control opening and closing of the switching units to activate and deactivate the sequences of lighting units.

This allows to easily control activation and deactivation of the sequences of lighting units.

In complement, each group may be powered using Pulse With Modulation, PWM, control of the switching units in parallel to the sequences of the group, and the command module may be configured to set a duty cycle of the PWM control based on the number of groups.

This allows performing the time sharing using PWM. Generally, command modules integrate microprocessor configured to perform PWM.

Still in complement, when the sequences to be activated are grouped in two groups, the command module is configured to set the duty cycle of the PWM control between 40% and 50%, or between 43% and 47%.

This ensures a good trade off between reducing power losses due to time sharing and avoiding closing/opening the switching units too abruptly, which could cause surge currents that damage the lighting units.

According to some embodiments, the command module may be configured to receive an input command, and the sequences to be activated may be determined based on the input command.

A second aspect of the invention concerns a method for powering at least a first lighting module configured to perform a first lighting function and comprising several sequences of at least one lighting unit in series. A maximum number N of lighting units that a power source is able to power at the same time is predefined The method comprises the following steps:

determine sequences to be activated and the number Na of lighting units comprised in the sequences to be activated;

if Na is greater than N, group the sequences to be activated in at least two groups, each group comprising less than N lighting units;

power cyclically and sequentially each of the groups based on a cycle period, wherein the cycle period is such that a viewer perceives the at least two groups being activated at the same time.

A third aspect of the invention concerns a computer program comprising instructions for implementing the method according to the second aspect of the invention, when the instructions are executed by a processor.

Other features and advantages of the invention are made explicit from the description detailed hereafter, and from the attached drawings, on which:

FIG. 1 shows a light assembly according to some embodiments of the invention;

FIG. 2 shows a time diagram illustrating time sharing between a first group of sequences of lighting units and a second group of sequences of lighting units, according to the invention.

FIG. 3 shows a time diagram illustrating time sharing between three groups of sequences of lighting units according to the invention.

FIG. 4 is a flowchart illustrating the steps of a method according to some embodiments of the invention, implemented in the command module.

FIG. 5 shows a structure of the command module according to one embodiment of the invention.

FIG. 1 illustrates a light assembly 100 according to some embodiments of the invention.

The light assembly comprises a power source 120 powering in series a first lighting module 130.1 and a second lighting module 130.2. The example of two lighting modules is given for illustrative purposes only. More generally, the light assembly 100 may comprise any number k of lighting modules, k being an integer equal to or greater than 1.

The power source 120 may comprise a converter to convert a source power into an output power to be applied to the lighting modules. The power source 120 may be a voltage source or a current source.

The power source 120 preferably delivers a DC voltage according to the invention.

To this end, the voltage source 120 may comprise a DC voltage source and a DC/DC converter. Alternatively, the voltage source 120 may comprise an AC voltage source and an AC/DC converter.

The first lighting module 130.1 is arranged to perform a first lighting function and the second lighting module 130.2 is arranged to perform a second lighting function. The first and second lighting modules 130.1 and 130.2 are connected in series.

No restriction is attached to the lighting functions that are performed by the lighting modules, which can be chosen among:

a high beam HB function;
a low beam LB function;
a daytime running lighting DRL function;
a position lighting PL function;
a turn indicator TI function;
any other lighting function.

In what follows, and for illustrative purposes only, it is considered that the first lighting module 130.1 is arranged to perform the TI function and the second lighting module 130.2 function is arranged to perform the DRL function and/or PL function. According to one embodiment, the second lighting module 130.2 is arranged to perform both DRL and PL functions.

To perform the first lighting function, the first lighting module 130.1 may comprise six sequences 135.1, 135.2, 135.3, 135.4, 135.5, 135.6 of lighting units 140. As illustrated on FIG. 1, each sequence 135 may comprise three lighting units 140. However, no restriction is attached to the number n1 of sequences of the first lighting module 130.1 and to the number k1 of lighting units per sequence. Alternatively, the number of lighting units 140 per sequence may vary so that each sequence of index i, i varying between 1 and n1, may comprise a number k(1,i) of lighting units 140.

According to the TI function, the sequences 135.1 to 135.6 may be sequentially powered one after the other.

To perform the second lighting function, the second lighting module 130.2 may comprise six sequences 136.1, 136.2, 136.3, 136.4, 136.5, 136.6 of lighting units 140. As illustrated on FIG. 1, each sequence 136 may comprise three lighting units 140. However, no restriction is attached to the number n2 of sequences of the second lighting module 130.2, and to the number k2 of lighting units per sequence. Alternatively, the number of lighting units 140 per sequence may vary so that each sequence j, j varying between 1 and n2, may comprise a number k(2,j) of lighting units 140.

The first and second lighting modules may be integrated in a headlamp.

The lighting units 140 can be any technology able to emit light when a voltage is applied to it. In what follows, the example of lighting units being diodes such as LEDs is considered, for illustrative purposes only. The wording «LED» is therefore used to replace «lighting unit» in what follows, without departing from the fact that the lighting unit can encompass other technologies than LED.

So as to control activation/deactivation of the sequences 135, each sequence 135.i is connected in parallel to a switching unit 150.i. Similarly, to control activation/deactivation of the sequences 136, each sequence 136.j is connected in parallel to a switching unit 151.j.

No restriction is attached to the technologies used for the switching units, which can for example be any transistor configured to perform a switching function. For example, the switching units may be N-MOS. Alternatively, the switching units may be P-MOS.

Each of the switching unit may be controlled by a command module 180 that is configured to issue command signal to open or close the switching units 150 and 151.

The light assembly 100 may further comprise an optional function switching unit 152, such as a low side switching LSS unit 152, that is configured to bypass the second lighting module 130.2 so as to deactivate the DRL/PL function, when the LSS unit 152 is closed. The command module 180 may also control the LSS unit 152.

When the LEDs 140 are connected in series, a maximum number of LEDs 140 can be powered simultaneously. The maximum number of LEDs that can be powered by the power source 120 is noted N. The number N depends on the power source 120.

In what follows, it is considered, for illustrative purposes only, the N is equal to 15.

Because of this, when the TI and the DRL/PL functions are such that more than 15 LEDs are to be turned off, the power source 120 is not able to power the lighting functions.

To overcome this, when the number of LEDs to be activated to perform the first and/or the second lighting function is more than the maximum number N, the command module 180 is configured to:
- group the sequences of LEDs to be activated in several groups, so that each group comprises less than the maximum number N of LEDs;
- power cyclically and sequentially each of the groups. The cycle period between two powering of a same group is such that a viewer perceives the groups as activated at the same time.

This allows turning on cyclically and sequentially more than N LEDs in series so that they are perceived by an external user as being turned on at the same time.

According to a first embodiment, the sequences of LEDs of the several groups perform the same function. For example, this is the case when the command module 180 determines to turn on the six sequences of LEDs of the first lighting module 130.1. In that case, 18 LEDs are to be turned on, which is greater than N=15 LEDs. Therefore, the command module 180 may activate cyclically and sequentially a first group of three sequences 135.1, 135.2 and 135.3, then a second group of three sequences 135.4, 135.5, 135.6. Therefore, at a single point in time, 9 LEDs are turned on, which can be powered by the power supply 120.

According to a second embodiment, the sequences of LEDs of the several groups are splitted between at least two lighting modules. Within one group of sequences, the sequences may belong to the same lighting module or to two different lighting modules.

For example, if the three sequences 135.1, 135.2 and 135.3 of the first lighting module 130.1 and the six sequences 136.1, 136.2, 136.3, 136.4, 136.5, 136.6 of the second lighting module 130.2 are determined to be activated by the command module 180. Therefore, 27 LEDs need to be turned on: to this end, the command unit 180 may cyclically and sequentially turn on a first group comprising the three sequences 135.1, 135.2 and 135.3, and a second group comprising the six sequences 136.1, 136.2, 136.3, 136.4, 136.5, 136.6. Alternatively, the first group may comprise the three sequences 135.1, 135.2, 135.3 and 136.1, and the second group may comprise the five sequences 136.2, 136.3, 136.4, 136.5, 136.5.

The specific examples described above are given for illustrative purposes only.

FIG. 2 shows a time diagram illustrating time sharing between a first group of sequences of lighting units and a second group of sequences of lighting units, according to the invention.

The time diagram shows how the command module 180 alternates between the first group of sequences and the second group of sequences. To this end, three time slots 201.1, 201.2 and 201.3 are allocated for powering the first group of sequences and three time slots 202.1, 202.2 and 202.3 are allocated for powering the second group of sequences.

Two consecutive time slots allocated to the same group are separated by a period 200. The period 200 is such that an eye of an external viewer perceives the first and second groups as activated at the same time over a duration 203. The external user cannot therefore distinguish which group of sequences of LEDs is turned-on at a given time.

For example, the powering frequency of a given group, obtained by the inverse of the period 200, may be greater than 100 Hz, for example is comprised between 100 and 300 Hz.

To achieve this, the command module 180 may perform Pulse Width Modulation on the switches 150-151 corresponding to the sequences of the first group and on the switches 150-151 corresponding to the sequences of the second group. For example, a duty cycle less than 50% can be applied to each of the two groups. Preferably, the duty cycle applied to each group is equal to 45%, which allows closing/opening the switching units 150 not to abruptly to avoid surge currents that could deteriorate the LEDs 140.

FIG. 3 shows a time diagram illustrating time sharing between three groups of sequences of lighting units according to the invention.

The time diagram shows how the command module 180 alternates between a first group of sequences a second group of sequences and a third group of sequences. To this end, over a duration 303, three time slots 301.1, 301.2 and 301.3 are cyclically allocated for powering the first group of sequences, three time slots 302.1, 302.2 and 302.3 are cyclically allocated for powering the second group of sequences and three time slots 303.1, 303.2 and 303.3 are allocated cyclically for powering the third group of sequences.

Two consecutive time slots allocated to the same group are separated by a period 300. The period 300 is such that an external viewer sees the first and second groups as activated at the same time over the duration 303. The external viewer cannot therefore distinguish which group of sequences of LEDs is turned on at a given time. The period 300 may be equal to the period 200 above. In that case, the time slots 301, 302 and 303 are shorter than the time slots 201 and 202.

For example, the powering frequency of a given group, obtained by the inverse of the period 200, may be greater than 100 Hz, for example is comprised between 100 and 300 Hz.

To achieve this, the command module 180 may perform Pulse Width Modulation on the switches 150-151 corresponding to the sequences of the first group, on the switches 150-151 corresponding to the sequences of the second group and on the switches 150-151 corresponding to the sequences of the third group. For example, a duty cycle less than 33% can be applied to each of the two groups. Preferably, the duty cycle applied to each group is equal to 30%, which allows closing/opening the switching units 150 not to abruptly to avoid surge currents that may deteriorate the LEDs 140.

The decision regarding which sequences are to be activated at a given time may be determined by the command module 180 based on an input command.

To this end, the command module 180 can be configured to:
- receive an input command;
- determine, based on the input command, the sequences 135 and 136 to be turned on, named active sequences hereafter;
- determine the number Na of LEDs in the active sequences;
- compare Na to the maximum number N;
- if Na is less than or equal to N,
- else, as explained above:
  - group the sequences of LEDs to be activated in several groups, so that each group comprises less than the maximum number N of LEDs;
  - power cyclically and sequentially each of the groups, wherein the period between two powering of a same group is such that an external viewer sees the groups being activated at the same time.

FIG. 4 is a flowchart illustrating the steps of a method according to some embodiments of the invention, implemented in the command module 180.

At step 400, the command module 180 receives an input command. The input command can be received from an external unit, such as a centralized control system of a vehicle, following an input by a driver of the vehicle. However, no restriction is attached to the input command, which can alternatively be automatically triggered.

At step 401, the command module 180 determines, based on the input command, the sequences 135 and 136 to be turned on, named active sequences. As explained above, the active sequences may be sequences from a unique lighting module 130.1 or 130.2, or may be sequences to at least two different lighting modules.

At step 402, the command module 180 determines the number Na of LEDs in the active sequences.

At step 403, the command module 180 compares the number Na to the maximum number N of LEDs in series that can be powered simultaneously by the power source 120.

At step 404, if Na is less than or equal to N, the command module 180 activates the active sequences by closing the corresponding switching units 150.

At step 405, if Na is greater than N, the command module 180 groups the sequences of LEDs to be activated in several groups, so that each group comprises less than the maximum number N of LEDs. As explained above, each group may comprise sequences of the same lighting module 130, or can comprise sequences from different lighting modules 130.

At step 406, the command module 180 powers sequentially each of the groups, the cycle period between two powerings of a same group being such that an external viewer sees the groups being activated at the same time. The groups are powered sequentially by controlling the switching units corresponding to the sequences of each group. Contrary to step 404, time sharing is used to power more than N LEDs over a given duration.

FIG. 5 shows a structure of the command module 180 according to one embodiment of the invention.

The command module 180 comprises a processor 502 configured to communicate in a unidirectional or bidirectional way, via one bus or several buses, with a memory 504 such as a Random Access Memory, RAM, a Read Only Memory ROM, or any other memory (Flesh EEPROM, etc). Alternatively, the memory 504 may comprises several memories of the abode identified types.

The memory 504 is configured to store, in a permanent or temporary way, associations between outputs of the command modules and the switching units 150 and 151. It may also store an input command received from an external entity.

The memory comprises instructions for implementing the steps of the method illustrated on FIG. 4.

The processor 502 is configured to execute these instructions.

The processor may be a micro-controller designed and configured for performing the steps of the method as described on FIG. 4.

The command module 180 may further comprise an input interface 501 and an output interface 503. The input interface 501 may be configured to receive data from an external entity, such as a central control unit. Such data can for example be an input command that can be used by the command module 180 to determine which sequences are to be activated.

The output interface 503 may comprise several pins, each pin being configured for issuing a control signal to control opening/closing of a switching unit 150, 151 or 152.

The present invention is not limited to the embodiments described above as examples: it extends to other alternatives.

The invention claimed is:

1. A light assembly comprising:
at least a first lighting module configured to perform a first lighting function and comprising several sequences of lighting units connected in series, wherein each sequence of the several sequences of lighting units includes at least one lighting unit;
a power source configured to power at least the first lighting module, wherein the power source is configured to power a maximum number N of lighting units at the same time, wherein the maximum number N is a positive integer; and
a command module configured to:
control activation and deactivation of each of the sequences of lighting units;
receive an input command;
determine sequences of the several sequences of lighting units to be activated based on the input command and a number Na of lighting units comprised in the sequences to be activated, wherein the number Na is a positive integer;
if Na is greater than N, group the sequences to be activated in at least two groups, each group comprising less than N lighting units; and
power cyclically and sequentially each of the groups based on a cycle period, wherein the cycle period is such that an external viewer perceives the at least two groups as being activated at the same time.

2. The assembly according to claim 1, further comprising at least a second lighting module configured to perform at least a second lighting function, wherein the second lighting module comprises several sequences, each sequence of the several sequences comprising at least one lighting unit.

3. The assembly according to claim 2, wherein each group comprises sequences of the same lighting module.

4. The assembly according to claim 2, wherein at least one group comprises sequences of the first lighting module and of the second lighting module.

5. The assembly according to claim 2, wherein the second lighting function is a daytime lighting function or a position lighting function.

6. The assembly according to claim 5, wherein the second lighting module is configured to perform both a daytime lighting function and a position lighting function.

7. The assembly according to claim 2, further comprising a function switching unit in parallel to the second lighting module, and wherein the command module is configured to close the switching unit to deactivate the second lighting module.

8. The assembly according to claim 7, wherein the second lighting module and the function switching unit are in low side position compared to the first lighting module.

9. The assembly according to claim 1, wherein the first lighting function is a Turn Indicator, TI, function.

10. The assembly according to claim 1, further comprising a switching unit in parallel to each of the sequence of lighting units, and wherein the command module is configured to control opening and closing of the switching units to activate and deactivate the sequences of lighting units.

11. The assembly according to claim 10, wherein each group is powered using Pulse With Modulation, PWM, control of the switching units in parallel to the sequences of the group, and wherein the command module is configured to set a duty cycle of the PWM control based on the number of groups.

12. The assembly according to claim 11, wherein, when the sequences to be activated are grouped in two groups, the command module is configured to set the duty cycle of the PWM control between 40% and 50%, or between 43% and 47%.

13. The assembly according to claim 3, wherein the second lighting function is a daytime lighting function or a position lighting function.

14. The assembly according to claim 3, further comprising a function switching unit in parallel to the second lighting module, and wherein the command module is configured to close the switching unit to deactivate the second lighting module.

15. The assembly according to claim 2, wherein the first lighting function is a Turn Indicator, TI, function.

16. The assembly according to claim 2, further comprising a switching unit in parallel to each of the sequence of lighting units, and wherein the command module is configured to control opening and closing of the switching units to activate and deactivate the sequences of lighting units.

17. A method for powering at least a first lighting module configured to perform a first lighting function and comprising several sequences of lighting units connected in series, wherein each sequence of the several sequences of lighting units includes at least one lighting unit,
   wherein a maximum number N of lighting units that a power source is able to power at the same time is predefined, wherein the maximum number N is a positive integer,
   wherein the method comprises:
      receiving an input command;
      determining sequences of the several sequences of lighting units to be activated based on the input command and the number Na of lighting units comprised in the sequences to be activated, wherein the number Na is a positive integer;
      if Na is greater than N, grouping the sequences to be activated in at least two groups, each group comprising less than N lighting units; and
      powering cyclically and sequentially each of the groups based on a cycle period, wherein the cycle period is such that a viewer perceives the at least two groups being activated at the same time.

18. A computer program comprising instructions for implementing the method according to claim 17, when the instructions are executed by a processor.

* * * * *